（12）United States Patent
Arnold (10) Patent No.: US 11,995,306 B1
(45) Date of Patent: *May 28, 2024

(54) METHOD FOR HIGHLY ACCURATE SELECTION OF ITEMS ON AN AXIS WITH A QUADRILATERAL CONTROL SURFACE

(71) Applicant: GOOGLE LLC, Mountain View, CA (US)

(72) Inventor: Baron Winfield Arnold, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,049

(22) Filed: Jul. 24, 2019

Related U.S. Application Data

(63) Continuation of application No. 14/737,931, filed on Jun. 12, 2015, now Pat. No. 10,372,317.

(51) Int. Cl.
| | |
|---|---|
| *G06F 3/0488* | (2022.01) |
| *G06F 3/04842* | (2022.01) |
| *G06F 3/04847* | (2022.01) |
| *G06F 3/0485* | (2022.01) |

(52) U.S. Cl.
CPC ........ *G06F 3/0488* (2013.01); *G06F 3/04842* (2013.01); *G06F 3/04847* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 6,414,686 B1 | 7/2002 | Protheroe et al. | |
| 9,532,111 B1 * | 12/2016 | Christie | G06F 3/03547 |
| 9,870,114 B1 | 1/2018 | Jones et al. | |
| 10,372,317 B1 * | 8/2019 | Arnold | G06F 3/04847 |
| 2004/0239692 A1 | 12/2004 | Balle et al. | |
| 2006/0024021 A1 | 2/2006 | Utsuki et al. | |
| 2006/0171453 A1 | 8/2006 | Rohlfing et al. | |
| 2007/0080938 A1 | 4/2007 | Robbin et al. | |
| 2007/0247435 A1 | 10/2007 | Benko et al. | |
| 2008/0055264 A1 | 3/2008 | Anzures et al. | |
| 2008/0065722 A1 | 3/2008 | Brodersen et al. | |
| 2008/0075368 A1 | 3/2008 | Kuzmin | |
| 2008/0126981 A1 | 5/2008 | Candrian et al. | |

(Continued)

*Primary Examiner* — William L Bashore
*Assistant Examiner* — Nathan K Shrewsbury
(74) *Attorney, Agent, or Firm* — Lowenstein Sandler LLP (57) ABSTRACT

A method for presenting a media item of a set of media items in a graphical user interface (GUI) of a client device is disclosed. The GUI is provided to present a media item in a set of media items. An input is received to select a first position on the GUI. A continuous movement of the input along a first axis of the GUI is detected to select a second position on the GUI from the first position. Responsive to detecting the continuous movement, a scrub rate corresponding to the second position in association with the first axis of the GUI is determined. A change in a direction of the continuous movement of the input towards a second axis of the GUI is detected. The second axis and the first axis are perpendicular to each other. Responsive to detecting the change in the direction of the continuous movement, one or more media items of the set of media items are advanced according to the scrub rate.

20 Claims, 6 Drawing Sheets

(56) References Cited

U.S. PATENT DOCUMENTS

| | | |
|---|---|---|
| 2008/0165141 A1 | 7/2008 | Christie |
| 2008/0168384 A1 | 7/2008 | Platzer et al. |
| 2008/0222546 A1 | 9/2008 | Mudd et al. |
| 2009/0002335 A1 | 1/2009 | Chaudhri |
| 2009/0024923 A1 | 1/2009 | Hartwig et al. |
| 2009/0077491 A1* | 3/2009 | Kim .................. G06F 3/04847 715/810 |
| 2009/0174677 A1 | 7/2009 | Gehani et al. |
| 2009/0199119 A1 | 8/2009 | Park et al. |
| 2010/0002016 A1 | 1/2010 | Kim |
| 2010/0231537 A1* | 9/2010 | Pisula ................ G06F 3/04855 345/173 |
| 2010/0251085 A1 | 9/2010 | Zearing et al. |
| 2010/0251164 A1 | 9/2010 | Karan et al. |
| 2011/0157053 A1 | 6/2011 | Webb et al. |
| 2011/0239155 A1 | 9/2011 | Christie |
| 2012/0030626 A1 | 2/2012 | Hopkins et al. |
| 2012/0054670 A1 | 3/2012 | Rainisto |
| 2012/0056840 A1 | 3/2012 | Benko et al. |
| 2012/0089910 A1 | 4/2012 | Cassidy |
| 2012/0200598 A1 | 8/2012 | Yoshimi et al. |
| 2013/0080895 A1 | 3/2013 | Rossman et al. |
| 2013/0307792 A1 | 11/2013 | Andres et al. |
| 2014/0109017 A1* | 4/2014 | Benko .................. G06F 3/0488 715/858 |
| 2014/0118273 A1 | 5/2014 | Seo |
| 2014/0356826 A1 | 12/2014 | Duffy |
| 2015/0046949 A1* | 2/2015 | Kalantri ............... H04N 21/472 725/46 |
| 2015/0054748 A1* | 2/2015 | Mason .................. G06F 3/0304 345/168 |
| 2015/0103003 A1 | 4/2015 | Kerr et al. |
| 2015/0135089 A1 | 5/2015 | Cudak et al. |
| 2015/0193031 A1 | 7/2015 | Tilak et al. |
| 2015/0193077 A1 | 7/2015 | Gao et al. |
| 2015/0268744 A1 | 9/2015 | Au et al. |
| 2017/0357427 A1* | 12/2017 | Wilson ................ G06F 3/04845 |

* cited by examiner

METHOD FOR HIGHLY ACCURATE SELECTION OF ITEMS ON AN AXIS WITH A QUADRILATERAL CONTROL SURFACE

CROSS-REFERENCE TO RELATED APPLICATIONS

This application is a continuation application of co-pending U.S. patent application Ser. No. 14/737,931, filed Jun. 12, 2015, entitled, "METHOD FOR HIGHLY ACCURATE SELECTION OF ITEMS ON AN AXIS WITH A QUADRILATERAL CONTROL SURFACE," which is herein incorporated by reference.

TECHNICAL FIELD

This disclosure relates to the field of content sharing platforms and, in particular, to providing highly accurate selection of items on an axis with a quadrilateral control surface.

BACKGROUND

On the Internet, content sharing platforms allow users to connect to and share information with each other. Content sharing platforms typically include a content sharing aspect that allows users to upload, view, and/or share content, such as video content, image content, audio content, and so on. The content may include content from professional content creators, e.g., movie clips, TV clips, music videos and professional photographs, as well as content from amateur content creators, e.g., video blogging, short original videos and photo albums.

Content sharing platforms may permit users to find and select items from content using an axis (e.g., an X axis). The axis can have multiple selectable positions and each position can correspond to an item. When a user selects a given position on the axis, the corresponding item can be displayed in a graphical user interface (GUI). For example, the items may be individual pictures in a photo gallery row view or may be single frames in a video that a user may navigate through using a touch and grab control. A user can select a position on the axis using the touch and grab control to view an item that corresponds to that position.

Conventionally, finding and selecting, from content, an item on an axis when the content includes hundreds or thousands of items may be difficult. With a touch and grab control (referred to herein as a scrub tool), a user may not be able to scroll through the items on the axis with much accuracy. The scrolling may be too fast or too slow to select an appropriate item, which hinders the user experience. For example, targeting a specific frame in a two hour video may entail the user moving the scrub tool only a single pixel to the left or right which can be inconvenient and difficult, especially on a relatively small screen. In addition, conventional media scrub tools typically do not allow users to control the scrub rate. For example, conventional scrub bars often jump in increments that are defined as a percentage of the total length of content. For example, a conventional scrub bar may use 10 second increments for a two-hour movie, which may not provide a user with the ability to scrub to an exact position in the movie. Similarly, when scrubbing through many pictures in a photo album, conventional tools typically permit the user to advance one photo at a time.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to present a media item of a set of media items in a user interface (UI) of a client device, where the UI comprises a first scrub area and a second scrub area. The first scrub area is associated with a first scrub rate, while the second scrub area is associated with a second scrub rate. The system receives a first user input via the UI to navigate through the set of media items at the first scrub rate, where the first user input includes an interaction with the first scrub area. The system receives a second user input via the UI to navigate through the set of media items at the second scrub rate, where the second user input includes an interaction with the second scrub area that is separate from the first user input.

In some embodiments, the set of media items may comprise a plurality of frames in a video.

In some embodiments, the set of media items may comprise a plurality of photos in a photo album.

In some embodiments, the first scrub rate advances the set of media items at a rate of more than one media item at a time and the second scrub rate advances the set of media items one at a time.

In some embodiments, the first scrub area and second scrub area each comprise a first region and a second region. The first region is for advancing media items in a forward direction and the second region is for advancing media items in a reverse direction.

In some embodiments, the first scrub area is displayed near the bottom of the UI, where the second scrub area is displayed above the first scrub area.

In some embodiments, the second scrub rate increases as the distance between the first scrub area and the position of the second user input increases.

In some embodiments, a system may include a memory and a processing device coupled to the memory. The processing device may present a media item of a set of media items in a UI of a client device, where the UI is comprised of a first scrub area and a second scrub area. The first scrub area is associated with a first scrub rate, while the second scrub area is associated with a second scrub rate. The system receives a first user input via the UI to navigate through the set of media items at the first scrub rate, where the first user input includes an interaction with the first scrub area. The system receives a second user input via the UI to navigate through the set of media items at the second scrub rate, where the second user input includes an interaction with the second scrub area that is separate from the first user input.

In some embodiments, a non-transitory machine-readable storage medium storing instructions may be executed to cause a processing device to perform operations such as presenting a media item of a set of media items in a UI of a client device, where the UI is comprised of a first scrub area and a second scrub area. The first scrub area is associated with a first scrub rate, while the second scrub area is associated with a second scrub rate. The system receives a first user input via the UI to navigate through the set of media items at the first scrub rate, where the first user input includes an interaction with the first scrub area. The system receives a second user input via the UI to navigate through the set of media items at the second scrub rate, where the second user input includes an interaction with the second scrub area that is separate from the first user input.

BRIEF DESCRIPTION OF THE DRAWINGS

The present disclosure is illustrated by way of example, and not by way of limitation, in the figures of the accompanying drawings.

DETAILED DESCRIPTION

Implementations are described for providing a quadrilateral control surface that allows items to be advanced along an axis at different scrub rates. Items may be, for example, individual photos in a photo gallery row view or single frames in a video that a user may navigate through. In implementations of the disclosure, a scrub tool of a media player may be modified to extend quadrilaterally to allow for different scrub rates when selecting an item within content. The scrub tool can refer to a user interface (UI) component that allows a user to go back and forth in time within content playing by the media player and visually illustrates the position of the currently played section within the content.

The scrub tool can include a scrub indicator that can be moved, based on user input, along the axis (e.g., the X axis) to scroll through items. In some implementations, the scrub indicator can also be moved, based on user input, in a direction that is substantially perpendicular to the axis. For example, a user can select the scrub indicator (such as with a cursor or a finger on a touch-sensitive device) and move along the axis to select different items within the content. In another example, the user can move the scrub indicator in a direction perpendicular to the axis to change a rate in which the content's items advance along the axis. For example, in the context of a movie, a user may advance frames of the movie at a first rate when coaxially advancing the frames along the axis. The user may then advance frames of the movie at a second rate (e.g., a faster rate) by performing a drag operation a distance away from the axis.

Conventionally, a user can drag a scrub indicator horizontally along an axis to advance through a set of media items at a certain scrub rate. In order to change the scrub rate, the user may need to drag the scrub indicator vertically and then horizontally along a different axis to advance through the set of media items at a different scrub rate. However, throughout the process, the user is typically required to maintain contact with the scrub indicator. This can be cumbersome and inconvenient for the user.

Aspects of the present disclosure address the above and other deficiencies by providing a convenient method for advancing through media items on a screen of a user device at different scrub rates without requiring a user to maintain constant contact with the screen. Specifically, after advancing through media items at a first scrub rate in an initial scrub area, the user can release contact with the screen, and then restart it again in a different scrub area to advance through media items at a second scrub rate. In other words, the user is able to advance through media items at a second scrub rate using an action that is separate from an action that was used for advancing through media items at a first scrub rate. As such, the client device can, for example, detect a user input in the first scrub area as the user drags their finger or cursor horizontally along a first axis, causing the client device to advance through the set of media items at the first scrub rate. Subsequently, the user can remove their finger from the screen or release the cursor, causing a period where the client device detects no user input related to scrubbing. Subsequently, the client device can detect a user input in the second scrub area as the user drags their finger or cursor horizontally along a second axis, causing the client device to advance through the set of media items at a second scrub rate. In some embodiments, the user is provided with the ability to select a point located in the second scrub area to advance through media items at a second scrub rate without first selecting a point in the first scrub area.

Figure 1:
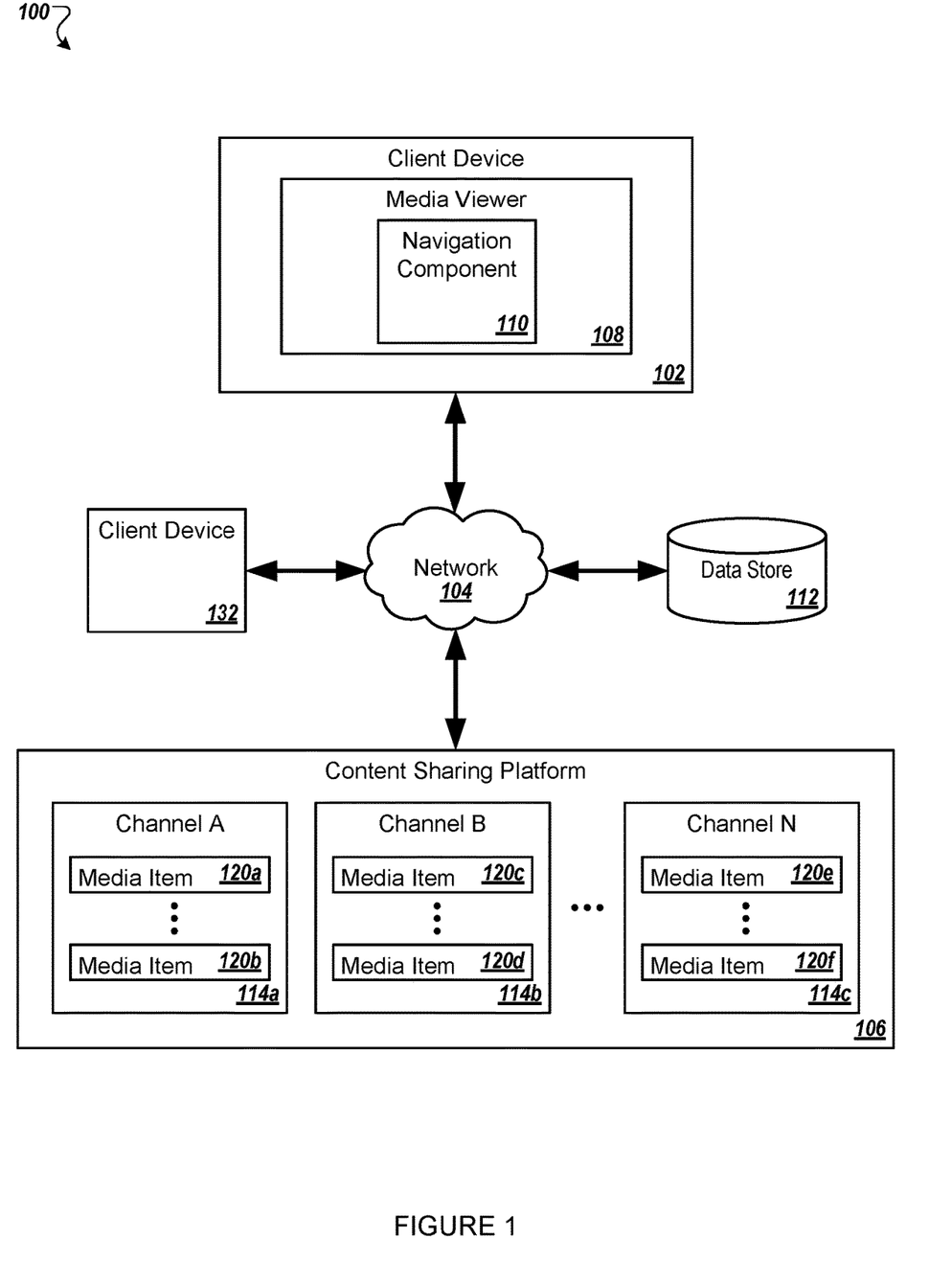
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls. The system architecture 100 includes client devices 102 and 132, a network 104, a data store 112, a content sharing platform 120, and a server 130. In one implementation, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 112 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 102, 132 may each include computing devices such as personal computers (PCs), laptops, mobile phones, smart phones, tablet computers, netbook computers, television remote controls, etc. In some implementations, client device 102, 132 may also be referred to as "user devices." A client device may include a media viewer 108. In one implementation, the media viewers 108 may be applications that allow users to view content, such as images, videos, web pages, documents, etc. For example, the media viewer 108 may be a web browser that can access, retrieve, present, and/or navigate content (e.g., web pages such as Hyper Text Markup Language (HTML) pages, digital media items, etc.) served by a web server. The media viewer 108 may render, display, and/or present the content (e.g., a web page, a media viewer) to a user. The media viewer 108 may also display an embedded media player (e.g., a Flash® player or an HTML5 player) that is embedded in a web page (e.g., a web page that may provide information about a product sold by an online merchant). In another example, the media viewer 108 may be a standalone application that allows users to view and browse digital media items (e.g., digital videos, digital images, electronic books, etc.).

The media viewer 108 may be provided to the client devices 102, 132 by the content sharing platform 106. For example, the media viewer 108 may be an embedded media player that is embedded in web pages provided by the content sharing platform 106. In another example, the media viewer 108 may be an application that is downloaded from a server (e.g., not shown) that is associated with an application store.

In general, functions described in one implementation as being performed by the content sharing platform 106 can also be performed on the client devices 102, 132 in other implementations if appropriate. In addition, the functionality attributed to a particular component can be performed by different or multiple components operating together. The content sharing platform 106 can also be accessed as a service provided to other systems or devices through appropriate application programming interfaces, and thus is not limited to use in websites.

In one implementation, the content sharing platform 106 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 106 may allow a user to consumer, upload, search for, approve of ("like"), dislike, and/or comment on media items. The content sharing platform 106 may also include a website (e.g., a webpage) that may be used to provide a user with access to the media items.

The content sharing platform 106 may include multiple channels (e.g., channels 114A through N). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel A can include videos 120a and 120b. A channel 114 can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel 114 can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel 114 may include one or more media items 120. Examples of a media item 120 can include, but are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc.

A media item 120 may be consumed via the Internet and/or via a mobile device application (e.g., media viewer 108). For brevity and simplicity, an online video (also hereinafter referred to as a video) is used as an example of a media item 120 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 106 may store the media items 120 using the data store 112. The content sharing platform 106 may also provide media items 120 outside of the context of a channel.

The media viewer of the client device 108 may include a navigation component 110. The navigation component 110 receives input from a user to advance forward or backward along an axis when viewing one or more media items. The axis can have multiple positions and each position can correspond to a media item. The navigation component 110 can advance the one or more media items forward or backward in response to the user input. For example, the navigation component 110 can fast forward a movie in response to a user input. In another example, the navigation component 110 can advance a presentation of multiple media items (e.g., a photo album) in response to a user input to navigate thought the media items. The navigation component 110 may present a scrub tool within a graphical user interface (GUI). The scrub tool may be a UI element of the media player that allows a user to go back and forth in time within a content item playing by the media player. The user may interact with the scrub tool to navigate the one or more media items. The scrub tool can include a scrub indicator illustrating the position of a currently presented media item (e.g., a video frame or a photo) within content (e.g., a movie or a photo album) played by the media player. The scrub tool may also optionally include a scrub bar on which the scrub indicator is positioned and along which the scrub indicator can be dragged. Alternatively, the scrub tool includes the scrub indicator but not the scrub bar. In some implementations, the scrub indicator is displayed on the scrub bar prior to user interaction with the scrub tool, and the user can select and drag the scrub indicator (e.g., using a finger or a cursor) along the scrub bar to advance through the media items. Alternatively, the scrub indicator may not be initially presented in an area on the screen. Rather, the user may first start a select and drag operation using a certain location in the area, which can cause the scrub indicator to appear where the user finger or the cursor is currently positioned. In another implementation, the scrub indicator may not be presented on the screen. Rather, the user may perform a select and drag operation using a certain location in the area without the scrub indicator appearing in the area on the screen.

In implementations of the disclosure, the navigation component 110 can modify a scrub tool of a media player of the content sharing platform to permit a user to have some control of the scrub rate while scrubbing through one or more media items arranged along the axis. For example, the navigation component 110 can permit a user to select a position in a first area in a GUI (e.g., with a cursor or a touch) to scroll through frames of a movie at a first scrub rate. The navigation component 110 can also permit the user to select a position in a second area in the GUI to scroll through the frames of the movie at a second scrub rate. In an example, the media viewer 108 may present a movie via a display of the client device 102. The user may touch and move the scrub indicator on the GUI to advance the movie at a fast rate, which enables the user to quickly scrub through the movie. The user may touch another area of the GUI to advance the movie at a slower rate, which enables more granularity of selection to the user to resume playback of the movie at an exact location of the user's choice.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 106 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

FIGS. 2A-E illustrate an example graphical user interface (GUI) 200 that may be used to receive user input to advance one or more media items along an axis at different scrub rates, in accordance with one implementation of the disclosure. The GUI 200 may include at least two scrub areas. In some embodiments, the GUI 200 includes a media viewer (e.g., the media viewer 108 of FIG. 1). As illustrated, the GUI 200 includes a first scrub area 202 and a second scrub area 204. When the user provides scrub input, via the first scrub area 202, to move to different positions within the first scrub area 202, media items can be presented in the GUI at a first rate. When the user provides scrub input, via the second scrub area 204 to move to different positions within the second scrub area 204, media items can be presented in the GUI at a second rate.

Figure 2A:
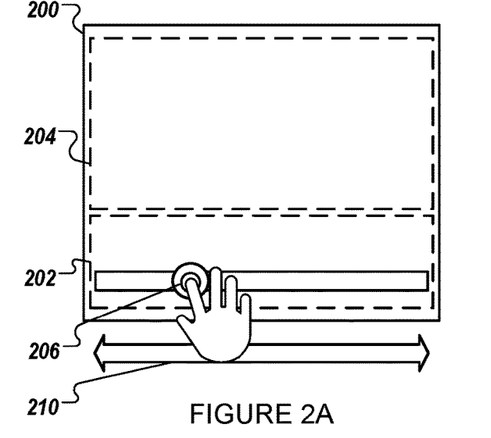
FIGS. 2A-E illustrate an example graphical user interface (GUI) that facilitate advancement of media items along an axis at different scrub rates, in accordance with one implementation of the disclosure.

FIG. 2A illustrates an example of a user input to advance media items arranged along an axis at a first rate. The user input is illustrated using a hand icon. GUI 200 may include a first scrub area 202 corresponding to a first scrub rate and a second scrub area 204 corresponding to a first scrub rate. The user can select the GUI 200 at position 206 and, while maintaining contact with the GUI 200, can slide horizontally along arrow 210. The horizontal slide of the user in the first scrub area 202 causes the GUI 200 to advance through media items at a first rate.

Figure 2B:
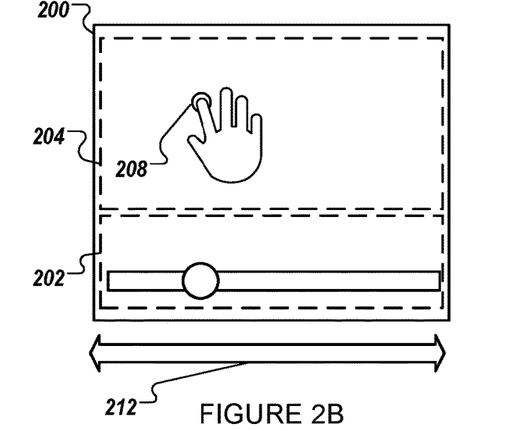

FIG. 2B illustrates an example of a user input to advance media items arranged along an axis at a second rate. The user can select the GUI 200 at position 208 within the second scrub area 204 and, while maintaining contact with the GUI 200, can slide horizontally along arrow 212. The user can select any point within the scrub area 204 and drag horizontally to advance items presented in the GUI 200 at a second scrub rate.

Figure 2C:
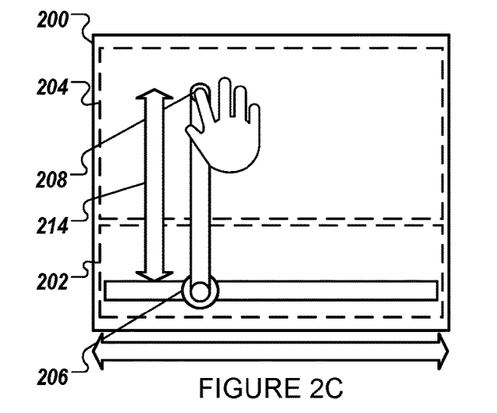

FIG. 2C illustrates an example of a user input to advance the presentation of media items arranged along an axis at a first rate and switching to advancing the media items at a second rate. The user can select the GUI 200 at position 206 within the first scrub area 202 and, while maintaining contact with the GUI 200, can slide in a direction perpendicular to the axis (e.g., along arrow 214) until the selected position is within the second scrub area 204. The user can then drag the selection horizontally to advance items presented in the GUI 200 at a second scrub rate. In the event that the user stops making contact in the second scrub area 204, the user may reinitiate contact in the second scrub area 204 to advance items presented in the GUI 200 at the second scrub rate. In a similar manner, the user can drag the selection back to the first scrub area 202 to then advance media items at the first scrub rate. In an example, the first scrub rate can be relatively faster than the second scrub rate. The user can advance through frames of a movie, for example, at a fast rate using the first scrub area 204. Once the movie is near a desired position, the user can use the second scrub area 202 to advance through the movie frames at a slower rate until the user finds the precise frame they seek.

Figure 2D:
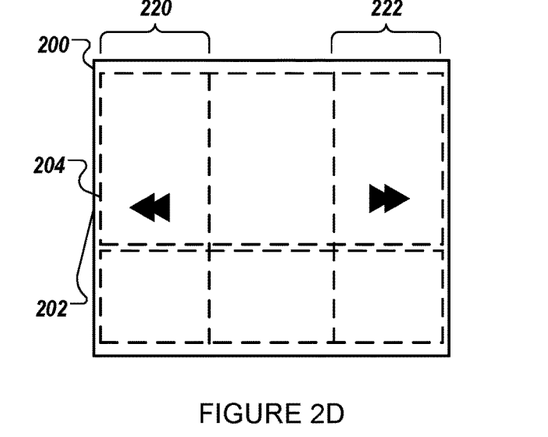

FIG. 2D illustrates another embodiment of the quadrilateral control surface that also includes action regions 220, 222. When a point within the action regions 220, 222 is selected, the GUI can perform an action that corresponds to the action region. For example, action region 220 can be to advance through media items in reverse (e.g., rewind) and action region 222 can be to advance through media items in a forward manner (e.g., fast forward). When the user selects the GUI 200 within the action region 220 and within the first scrub area 202, the user device (e.g., the media player) can advance the media items in reverse at the first scrub rate. When the user selects the GUI 200 within the action region 220 and within the second scrub area 204, the user device (e.g., the media player) can advance the media items in reverse at the second scrub rate. When the user selects the GUI 200 within the action region 222 and within the first scrub area 202, the user device (e.g., the media player) can advance the media items forward at the first scrub rate. When the user selects the GUI 200 within the action region 222 and within the second scrub area 204, the user device (e.g., the media player) can advance the media items forward at the second scrub rate.

Figure 2E:
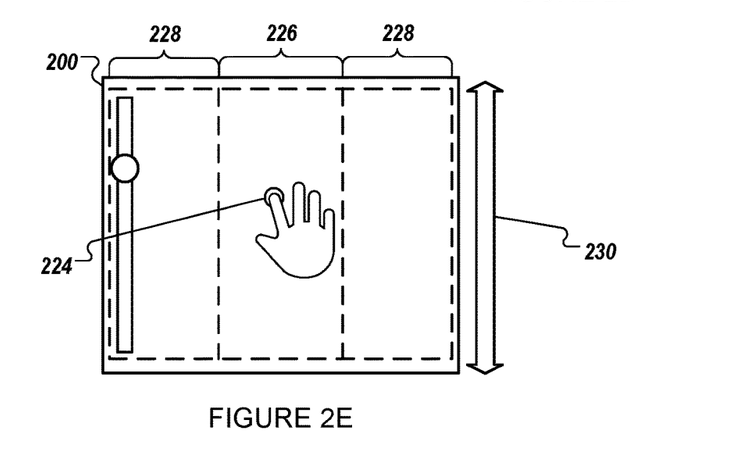

FIG. 2E illustrates an example of a user input to advance media items arranged along a vertical axis at a first rate and switch to advancing the media items at a second rate. The user can select the GUI 200 at position 224 within the first scrub area 226 and drag the selection vertically along arrow 230 to advance the items presented in the GUI 200 at a first scrub rate. In a similar manner, the user can select the GUI 200 within the second scrub areas 228 and drag the selection vertically to advance the items presented in the GUI 200 at a second scrub rate.

In one embodiment, the user device may be a touchscreen device being used as a television remote. In this embodiment, the user can select the GUI on the user device in a first scrub area and drag the selection to advance the media items presented on the television at a first scrub rate. The user can select the GUI on the user device in a second scrub area and drag the selection to advance the media items presented on the television at a second scrub rate.

Figure 3A:
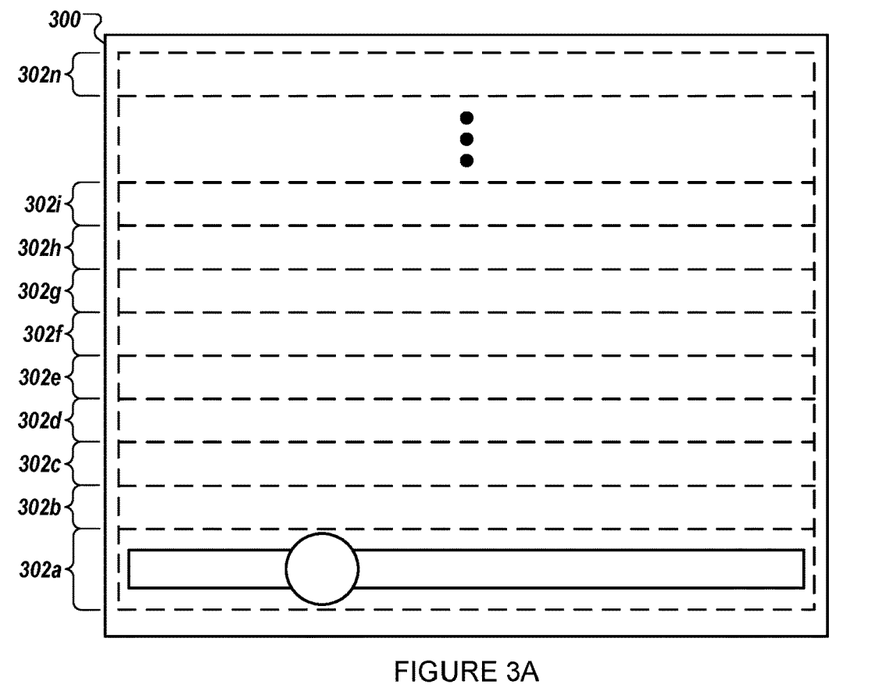
FIG. 3A illustrates an example quadrilateral control surface including multiple scrub areas that each correspond to a different scrub rate, according to some implementations of the disclosure.

FIG. 3A illustrates another embodiment of a quadrilateral control surface 300 that includes multiple scrub areas 302a-n that each correspond to a different scrub rate. Similar to the scrub areas 202 and 204 described in conjunction with FIGS. 2A-D, when a user selects a position within a scrub areas 302a-n and moves the selection to another position (e.g., by dragging the selected point or by releasing the selected point and selecting a different point in another scrub area), the GUI 300 can advance through media items at a rate that corresponds to the scrub area 302a-n. The scrub rate for each scrub area 302a-n can be different. In some embodiments, the scrub areas 302a-n can be arranged in the GUI 300 according to their respective scrub rate. For example, a scrub area 302a with a relatively fast scrub rate can be positioned near the bottom of the GUI 300. Moving upward, the next scrub area 302b can correspond to a relatively slower scrub rate than the scrub rate for the scrub area 302a. In the manner, when moving up the GUI 300, each scrub area 302 can correspond to an incrementally slower scrub rate with the scrub area with the slowest scrub rate (e.g., scrub area 302n) at the top of the scrub areas 302a-n. The scrub rates can increment by any value, such as by a linear multiplier, exponentially, and the like.

In some embodiments, a user input may include touching the GUI in a first position within a first scrub area and then moving to a second position that is within a second scrub area. In such embodiments, the GUI 300 advances the media items at the first scrub rate while the selection remains within the first scrub area and at the second scrub rate while the selection remains within the second scrub area.

In another embodiment, scrub areas 302a-n can be arranged where scrub area 302a corresponds to a relatively slow scrub rate and, when moving up the GUI 300, each scrub area can correspond to an incrementally faster scrub rate with the scrub area with the fastest scrub rate (e.g., scrub area 302n) at the top of scrub areas 302a-n.

Figure 3B:
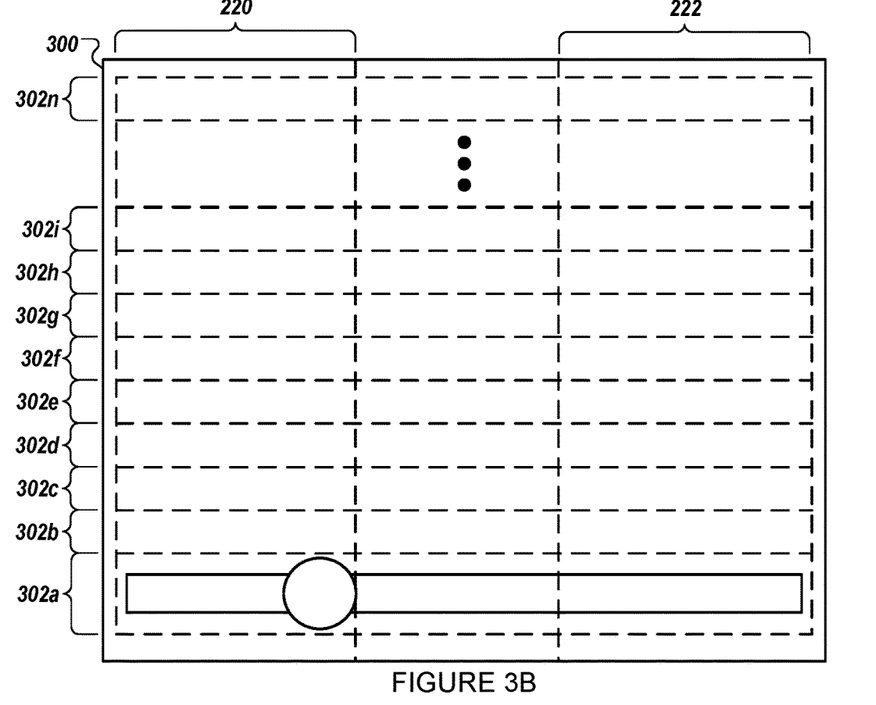
FIG. 3B illustrates an example quadrilateral control surface that includes the multiple scrub areas of FIG. 3A and the action regions of FIG. 2D, according to some implementations of the disclosure.

FIG. 3B illustrates an example quadrilateral control surface that includes the multiple scrub areas 302a-n of FIG. 3A and the action regions 220, 222 of FIG. 2D.

Figure 3C:
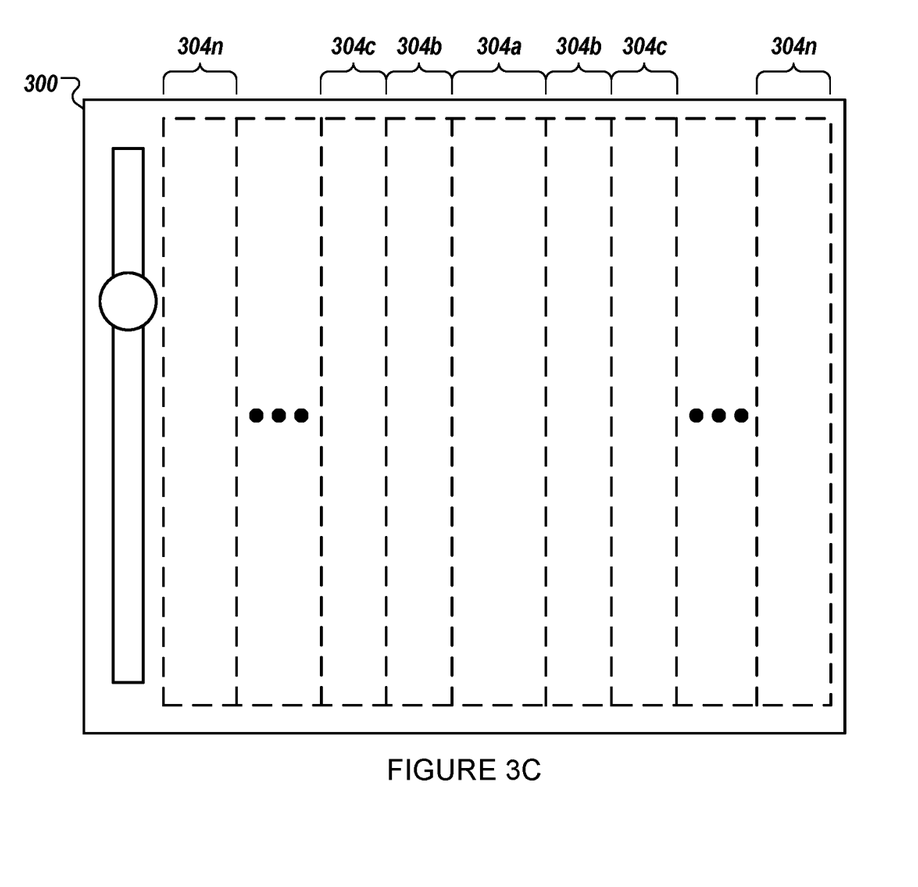
FIG. 3C illustrates an example quadrilateral control surface including multiple scrub areas that correspond to a different scrub rate, according to some implementations of the disclosure.

FIG. 3C illustrates an embodiment of a quadrilateral control surface 300 that includes multiple scrub areas 304a-n that each correspond to a different scrub rate. Similar to scrub areas 226 and 228 described in conjunction with FIG. 2E, when a user selects a position within a scrub areas 304a-n and moves the selection to another position (e.g., by dragging the selected point or by releasing the selected point and selecting a different point in another scrub area), the GUI 300 can advance through media items at a rate that corresponds to the scrub area 304a-n. The scrub rate for each scrub area 304a-n can be different. In some embodiments, the scrub areas 304a-n can be arranged in the GUI 300 according to their respective scrub rate. For example, a scrub area 304a with a relatively fast scrub rate can be positioned near the center of the GUI 300. Moving horizontally, the next scrub areas 304b can correspond to a relatively slower scrub rate than the scrub rate for the scrub area 304a. In the manner, when moving horizontally away from the center of the GUI 300, each scrub area 304 can correspond to an incrementally slower scrub rate with the scrub area with the slowest scrub rate (e.g., scrub area 304n) at the sides of the scrub areas 304a-n. The scrub rate can increment by any value, such as by a linear multiplier, exponentially, and the like.

Figure 4:
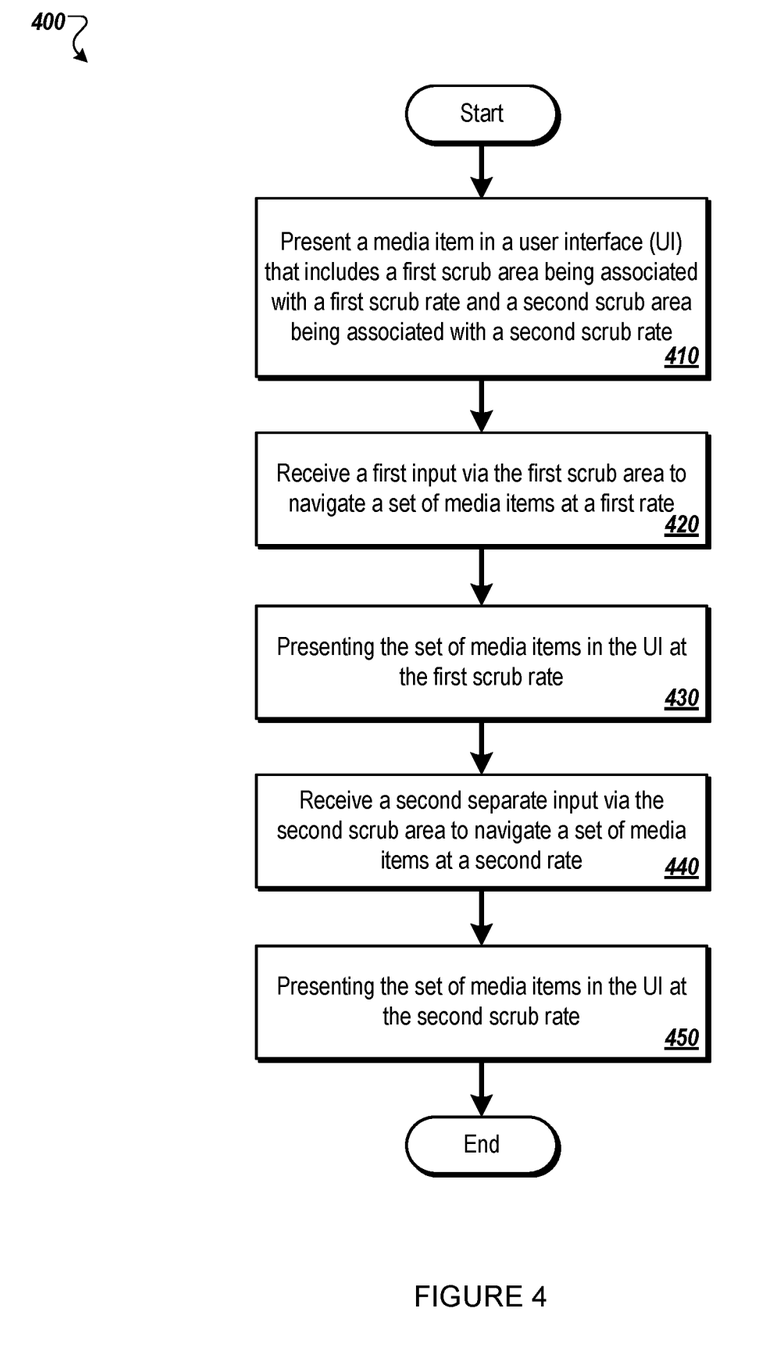
FIG. 4 is a flow diagram illustrating a method for providing a quadrilateral control surface to advance media items along an axis at different scrub rates, according to some implementations of the disclosure

FIG. 4 is a flow diagram illustrating a method 400 for providing a quadrilateral control surface, according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by navigation component 110 as shown in FIG. 1.

Referring to FIG. 4, method 400 begins at block 410 when the processing device presents a media item of a set of media items in a user interface (UI) of a client device. The UI includes a first scrub area and a second scrub area, the first scrub area being associated with a first scrub rate and the second scrub area being associated with a second scrub rate. The set of media items can include a plurality of frames of a video or a plurality of images (e.g., photos of a photo album).

At block 420, the processing device receives a first user input via the first scrub area of the UI to navigate through the set of media items at a first scrub rate. In some embodiments, the first scrub rate advances the set of media items one at a time, and wherein the second scrub rate advances the set of media items at a rate of more than one media item at a time.

At block 430, the processing device presents the set of media items in the UI at the first scrub rate.

At block 440, the processing device receives a second user input via the second scrub area of the UI to navigate through the set of media items at a second scrub rate. In some embodiments, the first scrub area and the second scrub area each include a first region and a second region. The first region can be for advancing media items in a forward direction and the second region can be for advancing media items in a reverse direction. In some embodiments, the second scrub rate increases as a distance between the first scrub area and the position of the second user input increases.

At block 450, the processing device presents the set of media items in the UI at the second scrub rate.

Figure 5:
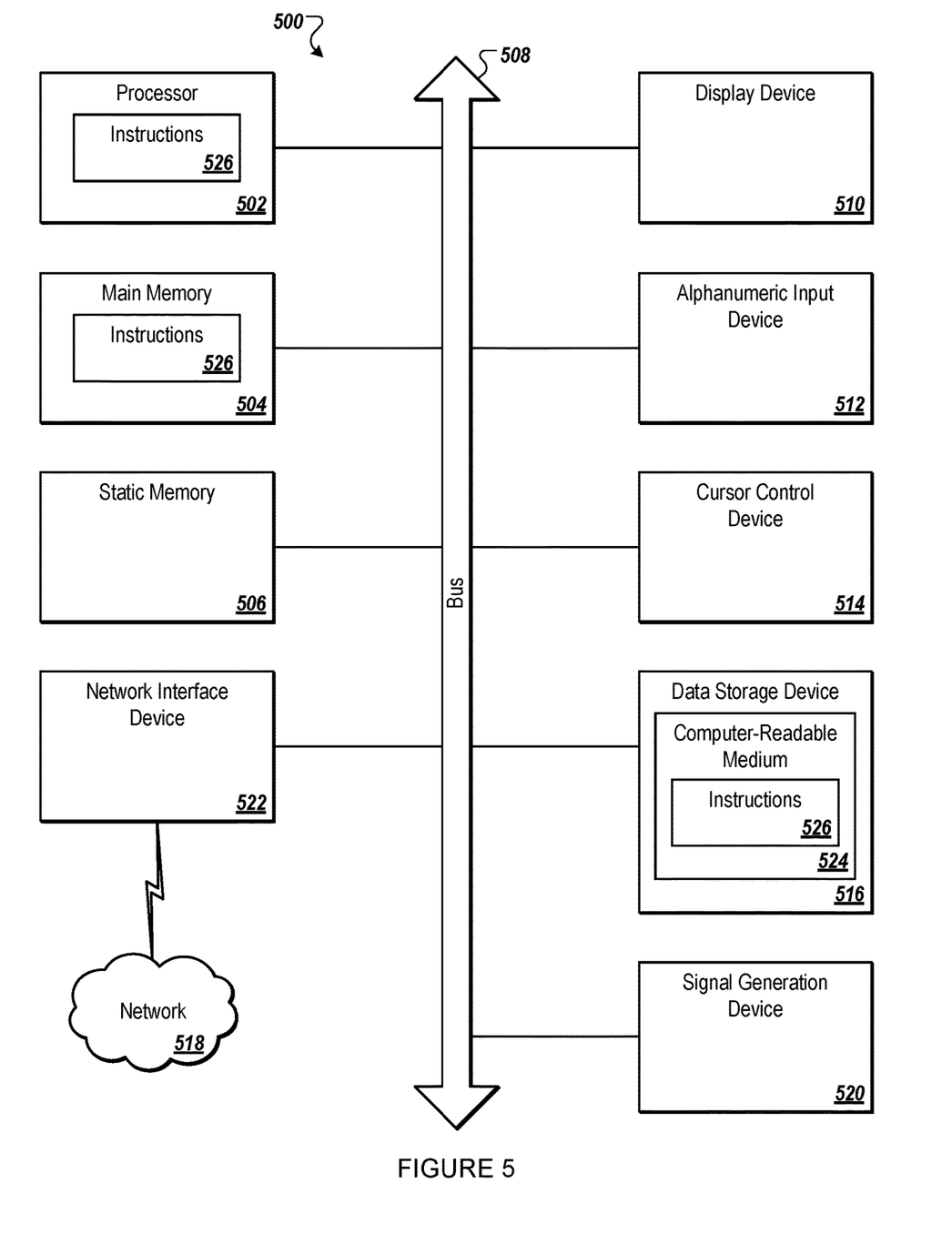
FIG. 5 is a block diagram illustrating an exemplary computer system, according to some implementations.

FIG. 5 illustrates a diagrammatic representation of a machine in the exemplary form of a computer system 500. The computer system 500 executes one or more sets of instructions 526 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 526 to perform any one or more of the methodologies discussed herein.

The computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions of the system architecture 100 for performing the operations and steps discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored the sets of instructions 526 of the [[SYSTEM]] embodying any one or more of the methodologies or functions described herein. The sets of instructions 526 of the [[SYSTEM]] may also reside, completely or at least partially, within the main memory 504 and/or within the processor 502 during execution thereof by the computer system 500, the main memory 504 and the processor 502 also constituting computer-readable storage media. The sets of instructions 526 may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions 526. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing a graphical user interface (GUI) on a mobile device to present a plurality of media items;
   receiving user input to select a first position on the GUI;
   detecting a continuous movement of the user input along a first axis of the GUI to a second position on the GUI from the first position;
   responsive to the detecting of the continuous movement:
      determining a first scrub rate corresponding to the continuous movement of the user input to the second position, and
      advancing media items of the plurality of media items in association with the first axis of the GUI in accordance with the first scrub rate;
   detecting a change in a direction of the user input to begin moving towards a second axis of the GUI to a third position in the GUI, wherein the user input indicates a fast forward request or a rewind request, wherein the second axis and the first axis are different axes; and
   responsive to the detecting of the change in the direction of the user input to begin moving towards the second axis to the third position, determining a second scrub rate corresponding to a movement of the user input to the third position, and advancing media items of the plurality of media items in the GUI of the mobile device according to the second scrub rate.

2. The method of claim 1, wherein the determining of the scrub rate comprises:
   responsive to determining that the second position becomes further away from the first position, determining the scrub rate to be slower.

3. The method of claim 1, wherein the advancing of the media items comprises:
   determining whether the change in the direction of the user input to begin moving towards the second axis is towards a first end or second end of the second axis of the GUI; and
   performing either operation (i) or operation (ii), wherein:
   operation (i) comprises responsive to determining that the change in the direction of the user input to begin moving towards the second axis is towards the first end of the second axis of the GUI, forward advancing the media items according to the scrub rate; and
   operation (ii) comprises responsive to determining that the change in the direction of the user input to begin moving towards the second axis is towards the second end of the second axis of the GUI, backward advancing the media items according to the scrub rate.

4. The method of claim 1, wherein the advancing of the media items comprises:
   providing a respective media item on the GUI for presentation while advancing the media items according to the scrub rate.

5. The method of claim 1, wherein the providing of the GUI comprises:
   presenting a media item on the GUI; and
   providing, on the GUI, a scrub tool illustrating a position of the presented media item within the plurality of media items.

6. The method of claim 5, wherein the first axis is perpendicular to the scrub tool and the second axis is parallel to the scrub tool.

7. The method of claim 5, wherein receiving of the user input to select the first position on the GUI comprises:
   receiving the user input to select the first position on the GUI that is not associated with the scrub tool.

8. A system comprising:
a memory; and
a processor operatively coupled to the memory, the processor to:
provide a graphical user interface (GUI) on a mobile device to present a plurality of media items;
receive a user input to select a first position on the GUI;
detect a continuous movement of the user input along a first axis of the GUI to a second position on the GUI from the first position;
responsive to the detecting of the continuous movement:
determine a first scrub rate corresponding to the continuous movement of the user input to the second position, and
advance media items of the plurality of media items in association with the first axis of the GUI in accordance with the first scrub rate;
detect a change in a direction of the user input to begin moving towards a second axis of the GUI to a third position in the GUI, wherein the user input indicates a fast forward request or a rewind request, wherein the second axis and the first axis are different axes; and
responsive to the detecting of the change in the direction of the user input to begin moving towards the second axis to the third position, determine a second scrub rate corresponding to a movement of the user input to the third position, and advancing media items of the plurality of media items in the GUI of the mobile device according to the second scrub rate.

9. The system of claim 8, wherein to determine the scrub rate, the processor is to:
responsive to determining that the second position becomes further away from the first position, determine the scrub rate to be slower.

10. The system of claim 8, wherein to advance the media items, the processor is to:
determine whether the change in the direction of the user input to begin moving towards the second axis is towards a first end or second end of the second axis of the GUI; and
perform either operation (i) or operation (ii), wherein:
operation (i) comprises responsive to determining that the change in the direction of the user input to begin moving towards the second axis is towards the first end of the second axis of the GUI, forward advance the media items according to the scrub rate; and
operation (ii) comprises responsive to determining that the change in the direction of the user input to begin moving towards the second axis is towards the second end of the second axis of the GUI, backward advance the media items according to the scrub rate.

11. The system of claim 8, wherein to advance the media items, the processor is to:
provide a respective media item on the GUI for presentation while advancing the media items in the GUI according to the scrub rate.

12. The system of claim 8, wherein to provide the GUI, the processor is to:
present a media item on the GUI; and
provide, on the GUI, a scrub tool illustrating a position of the presented media item within the plurality of media items.

13. The system of claim 12, wherein the first axis is perpendicular to the scrub tool and the second axis is parallel to the scrub tool.

14. The system of claim 12, wherein to receive the user input to select the first position on the GUI, the processor is to:
receive the user input to select the first position on the GUI that is not associated with the scrub tool.

15. A non-transitory computer readable storage medium comprising instructions that, when executed by a processor, cause the processor to:
provide a graphical user interface (GUI) on a mobile device to present a plurality of media items;
receive a user input to select a first position on the GUI;
detect a continuous movement of the user input along a first axis of the GUI to a second position on the GUI from the first position;
responsive to the detecting of the continuous movement:
determine a first scrub rate corresponding to the continuous movement of the user input to the second position, and
advance media items of the plurality of media items in association with the first axis of the GUI in accordance with the first scrub rate;
detect a change in a direction of the user input to begin moving towards a second axis of the GUI to a third position in the GUI, wherein the user input indicates a fast forward request or a rewind request, wherein the second axis and the first axis are different axes; and
responsive to the detecting of the change in the direction of the user input to begin moving towards the second axis to the third position, determine a second scrub rate corresponding to a movement of the user input to the third position, and advancing media items of the plurality of media items in the GUI of the mobile device according to the second scrub rate.

16. The non-transitory computer readable storage medium of claim 15, wherein to determine the scrub rate, the processor is to:
responsive to determining that the second position becomes further away from the first position, determine the scrub rate to be slower.

17. The non-transitory computer readable storage medium of claim 15, wherein to advance the media items, the processor is to:
determine whether the change in the direction of the user input to begin moving towards the second axis is towards a first end or second end of the second axis of the GUI; and
perform either operation (i) or operation (ii), wherein:
operation (i) comprises responsive to determining that the change in the direction of the user input to begin moving towards the second axis is towards the first end of the second axis of the GUI, forward advance the media items according to the scrub rate; and
operation (ii) comprises responsive to determining that the change in the direction of the user input to begin moving towards the second axis is towards the second end of the second axis of the GUI, backward advance the media items according to the scrub rate.

18. The non-transitory computer readable storage medium of claim 15, wherein to advance the media items of the plurality of media items, the processor is to:
provide a respective media item on the GUI for presentation while advancing the media items in the GUI according to the scrub rate.

19. The non-transitory computer readable storage medium of claim 15, wherein to provide the GUI, the processor is to:
present a media item on the GUI; and provide, on the GUI, a scrub tool illustrating a position of the presented media item within the plurality of media items.

20. The non-transitory computer readable storage medium of claim 19, wherein the first axis is perpendicular to the scrub tool and the second axis is parallel to the scrub tool.

* * * * *